United States Patent Office 3,341,575
Patented Sept. 12, 1967

3,341,575
PREPARATION OF ESTERS FROM ALKYL CHLORIDES AND CARBOXYLIC ACID SALTS IN THE PRESENCE OF AMIDE SOLVENT AND A SOLUBLE IODIDE COMPOUND
William L. Fierce, Crystal Lake, Ill., and Roger L. Weichman, Orono, Maine, assignors, by mesne assignments, to Union Oil Company of California, Los Angeles, Calif., a corporation of California
No Drawing. Filed Mar. 19, 1965, Ser. No. 441,316
16 Claims. (Cl. 260—493)

This invention relates to a process for producing carboxylic acid esters, and more particularly to a process for producing esters of fatty acids by reacting alkali metal salts of a fatty acid with normal alkyl chlorides and certain alkylene dichlorides in certain solvents and in the presence of a catalytic amount of a soluble iodide compound.

It is known in the prior art that aliphatic halides, that is, aliphatic chlorides, bromides and iodides, can be slowly converted to esters at temperatures near 200° C. by reaction with metal salts of fatty acids. Several versions of this reaction are reported in the prior art to include the reaction of a halogenated paraffin wax with a metal salt of a carboxylic acid, such as sodium acetate, in solvents like glacial acetic acid, butyl alcohol and benzene. The reaction proceeds with or without a soluble iodide catalyst and at best the reaction times are long, on the order of 40 to 100 hours or more, using temperatures ranging from 120° C. to 200° C.

In one version of the reaction, Tucker 2,399,959 discloses that lowered reaction temperatures on the order of 140° C. and reaction times of about 24 hours are possible by using certain amide solvents. This patent fails to report any yields. Our investigations have disclosed that dimethylformamide (DMF) is an excellent solvent for the reaction of so-called reactive halogen compounds such as alkyl bromides with metal carboxylates to form esters and that DMF as the solvent aids the reaction using alkyl chlorides, but only provided a certain threshold temperature is reached and a suitable catalyst is present.

From a commercial viewpoint a process utilizing alkyl chlorides as one reactant such as the instant invention would be more desirable than one using alkyl bromides. For example, selected petroleum fractions can be readily chlorinated, and the normal alkyl chlorides separated therefrom and converted to low-cost esters for use as solvents, plasticizers and other known uses, depending on the type of carboxylic acid salt used. This invention is directed to the discovery of conditions which make it possible to economically convert alkyl chlorides, normally considered unreactive, to good yields of various esters useful as solvents, plasticizers for resins, organic intermediates and other known uses.

In accordance with this invention we have found that unreactive normal alkyl chlorides and certain alkylene dichlorides can be converted to esters or diesters in good yields by reaction with carboxylic acid salts in certain solvents as herein defined and in the presence of a catalytic amount of a soluble iodide at a temperature of about 100° C. to about 140° C. using reaction times in the order of one hour or more.

The solvents useful in accordance with this invention are normally liquid, stable amides of carboxylic acids having a total of 2 to 12 carbon atoms, containing only the elements C, H, O and N and having the formula $$\begin{array}{c} R-C=O \\ | \\ N(R^1)_2 \end{array}$$

wherein R is a substituent of the group consisting of hydrogen and $C_1$ to $C_4$ alkyl, e.g., methyl, ethyl, propyl, isopropyl, butyl and isobutyl, $R^1$ is a substituent of the group consisting of hydrogen and $C_1$ to $C_4$ alkyl, e.g., methyl, ethyl, propyl, isopropyl, butyl and isobutyl, and wherein at least one $R^1$ is alkyl as just defined. When R is hydrogen, methyl, ethyl, propyl or butyl and $R^1$ is methyl the preferred sub-group of N-methylformamide, N,N-dimethylformamide, N-methylacetamide, N,N-dimethylacetamide, N-methylpropionamide, N,N-dimethylpropionamide, N-methylbutyramide and N,N-dimethylbutyramide are defined. Although the aforedefined compounds are stated as equivalents for purposes of this invention, this does not mean that comparable results will be obtained by using each of these solvents. The experiments reported herein demonstrate that N,N-dimethylformamide gives outstanding results under a certain range of conditions. Based on this at least comparable results are obtainable using the sub-group of the above formula wherein R is methyl or ethyl and $R^1$ is methyl, e.g., N,N-dimethylacetamide, N,N-dimethylpropionamide and DMF.

A primary object of this invention is to provide a method of converting normal alkyl chlorides and certain alkylene dichlorides to esters by reaction with carboxylic acid salts.

Another object of this invention is to provide a method of converting unreactive normal alkyl chlorides to useful esters in good yields by reaction with carboxylic acid salts in the presence of N,N-dimethylformamide and a catalytic amount of an iodide salt which is soluble in the solvent.

Still another object and feature of this invention is to provide a process for producing n-decyl acetate by reacting n-decyl chloride (1-chlorodecane) with sodium acetate at about 100° C. in DMF solution in the presence of small amounts of sodium iodide.

A further object of this invention is to provide a process for producing a mixed mono- and diester product by reacting 1,3-dichloropropane with sodium acetate at a temperature of about 70° to 100° C. in the presence of sodium iodide using DMF as the mutual solvent.

Still another object of this invention is to provide a process of producing a diester product by reacting 1,3-dichloropropane and sodium acetate at a temperature of about 130° to 150° C. in the presence of sodium iodide and DMF.

These and other objects of this invention will become apparent or be described as the specification proceeds. The ester products are useful as solvents and as ingredients in paints and varnishes.

A feature of this invention is the discovery that dimethylformamide is a mutual solvent for the reactants and that soluble iodides of the formula

MI wherein M is an alkali metal or ammonium such as sodium iodide, potassium iodide, cesium iodide, rubidium iodide, and ammonium iodide and organic iodides of the formula $R^2I$ wherein $R^2$ is normal alkyl of 1 to 10 carbon atoms or branched-chain alkyl of 3 to 10 carbon atoms such as methyl iodide, ethyl iodide, propyl iodide, isopropyl iodide, butyl iodide, isobutyl iodide, tert-butyl iodide, amyl iodide, hexyl iodide, heptyl iodide and 1-iodo decane and mixtures thereof, when present during the reaction, enhance the yield of ester product and reduce the heat requirements for the reaction.

In the process of this invention, the halogen compound is contacted with the metal salt, e.g., the sodium or potassium salt of a carboxylic acid, with a soluble iodide catalyst, in a solvent or solvent mixture as herein defined. By this procedure it is possible to avoid the drawbacks of the previously known methods. The reaction time is shortened, the use of higher temperatures is obviated and large amounts of carboxylic acid salt can be handled without difficulty.

Experiments on this new procedure have shown that dimethylformamide (DMF), when used at a temperature of at least about 100° C. in the presence of a soluble iodide catalyst, unexpectedly gives good yields of ester product. Solvents, such as toluene, which cannot dissolve polar materials, and polar solvents which cannot dissolve the halides are not effective.

Preliminary work using n-amyl chloride and sodium acetate as the reactants at 100° C. established that the reaction was aided by the solvent DMF and also by the presence of sodium iodide as the catalyst. Accordingly, a representative normal alkyl chloride, namely, 1-chlorodecane was chosen and a more detailed study of the reaction with sodium acetate was made to confirm these earlier results. Since an amine catalyst is stated in the prior art to promote the formation of glycol diesters (Coleman 2,021,-852) the effect of same on the reaction was also tested. The results are shown in Table I wherein the ester yields were determined by measuring the refractive index of the product.

TABLE I

Charge: 150 ml. solvent
1.0 ml. Pr₃N (tripropylamine)
48.0 g. (0.272 mole) 1-chlorodecane
25.0 g. (0.305 mole) sodium acetate

| Run No. | Solvent | NaI (g.) | Temp. (° C.) | Time (Hrs.) | Ester Yield |
|---|---|---|---|---|---|
| 1 | 1.butanol | 1.0 | 116 | 1 | 0 |
| 2 | DMF | 0 | 100 | 1 | 0 |
| 3 | DMF | 1.0 | 100 | 1 | 0 |
| 4 | DMF | 5.0 | 100 | 1 | 0 |
| 5 | DMF | 1.0 | 100 | 4 | 29.5 |

Experiments 1 to 5 indicate that in conducting the reaction at 100° C. the combined use of DMF and NaI and increased time caused the reaction to proceed. At 100° C. the amount of NaI did not appear to influence the reaction. The times recorded in Table I are exclusive of ½ hour required to bring the reactant mixture to temperature.

These results indicate that (1) there is a threshold temperature of about 100° C., (2) even above this threshold temperature 1-butanol was not a successful solvent and (3) the time, temperature and nature of the solvent are important to the reaction. A further study was made to determine the effect of these variables. The results are shown in Table II, using the same reactant charge.

TABLE II

Charge: 150 ml. solvent
25.0 g. (0.305 mole) sodium acetate
1.0 ml. Pr₃N (tripropylamine)
48.0 g. (0.272 mole) 1-chlorodecane

| Run No. | Solvent | NaI (g.) | Temp. (° C.) | Time (Hrs.) | Ester Yield $N_D^{20}$ Method | Ester Yield G.C. Method |
|---|---|---|---|---|---|---|
| 6 | DMF | 0 | 120 | 1 | 19.0 | |
| 7 | DMF | 1.0 | 120 | 1 | 37.8 | |
| 8 | DMF | 2.0 | 120 | 1 | 50.4 | |
| 9 [1] | | 1.0 | 120 | 1 | 0.55 | |
| 10 [2] | DMF | 1.0 | 120 | 1 | 39.6 | 43.6 |
| 11 | DMF | 0 | 140 | 1 | 69.9 | |
| 12 | DMF | 0 | 140 | 3 | 92.6 | |
| 13 | DMF | 1.0 | 140 | 1 | 87.6 | |

[1] Run with no solvent.
[2] Pr₃N not used.

The results shown in Table II establish that (1) a solvent is necessary, even at 120° C.; (2) the presence of the soluble iodide catalyst and the amount thereof has an influence on the reaction; (3) at 120° C. the effect of the Pr₃N is not pronounced, (compare Runs 7 and 10); and (4) at 140° C. DMF is effective with or without the soluble iodide, the effects of the latter being primarily to reduce the time of the reaction.

In order to further explore the reaction a series of four runs were made with different alkyl chlorides, different temperatures and a different source of soluble iodide. The results are shown in Table III.

TABLE III

| Charge | Run No. 14 | Run No. 15 | Run No. 16 | Run No. 17 |
|---|---|---|---|---|
| DMF, ml | 150 | 150 | 150 | 150 |
| Pr₃N, ml | 1.0 | 1.0 | 1.0 | 1.0 |
| Sodium acetate, mol | 0.305 | 0.305 | 0.305 | 0.305 |
| Cyclohexyl chloride, mol | | | 0.272 | 0.272 |
| 2-chlorooctane, mol | 0.272 | 0.272 | | |
| Chlorodecane, mol | | | | |
| NaI, g | 1.0 | | 1.0 | 1.0 |
| 1-iododecane, ml | | 2.0 | | |
| Conditions: | | | | |
| Temp. (° C.) | 140 | 120 | 120 | 141 |
| Time (Hrs.) | 1 | 1 | 1 | 1 |
| Ester Yield: | | | | |
| $N_D^{20}$ method | 15.4 | | <1.0 | <1.0 |
| G.C. method | | 50.2 | | |

Run 15 shows that an organic iodine compound can be the source of catalyst for the reaction. Runs 14, 16 and 17 show that secondary alkyl chlorides are much less reactive in the process of this invention than primary alkyl chlorides.

A feature of this invention is the discovery that the alkylene dichlorides present somewhat of an anomaly in this reaction in that 1,2-dichloroethane is unreactive, but 1,3-dichloropropane and the remaining members of the series, having up to 10 carbon atoms in the molecule, can be reacted at low temperatures to selectively produce mixtures of the monoester and diester or to produce the diester exclusively and in substantial yields. This is demonstrated by the following experiments, carried out using the procedures described in connection with the proceeding runs, as set forth in Table IV.

TABLE IV

| Run No | 18 | 19 | 20 | 21 |
|---|---|---|---|---|
| Time (hrs.) | 8 | 2 | 7.5 | 7.5 |
| Temp. (° C.) | 75 | 75-80 | 75 | 140 |
| Ml. DMF | 250 | 250 | 250 | 250 |
| Reactant conc. (moles): | | | | |
| 1,2-dichloroethane | 0.5 | 0.5 | | |
| 1,3-dichloropropane | | | 0.5 | 0.5 |
| Sodium acetate | 1.1 | 1.1 | 1.1 | 1.1 |
| Catalysts: | | | | |
| Sodium iodide (moles) | 0.067 | | 0.067 | 0.067 |
| Pr₃N (ml.) | | 2.0 | | |
| Product (percent yield): | | | | |
| Monoester | 0.0 | 0.0 | 50.2 | 0.0 |
| Diester | 0.0 | 0.0 | 21.1 | 72.3 |

The invention is directed to the use of normal alkyl chlorides of the formula $$R^3\text{—}Cl$$

wherein the chlorine atom is terminal and $R^3$ is a $C_1$ to $C_{20}$ aliphatic group, and normal alkylene dichlorides of the formula $Cl\text{—}R^4\text{—}Cl$ wherein $R^4$ is $C_3$ to $C_{20}$ alkylene.

Specific examples of normal aliphatic chlorides and alkylene dichlorides that can be used in the reaction are:

methylchloride
ethylchloride
1-chloropropane
1-chlorobutane
1-chloropentane
1-chlorohexane
1-chloroheptane
1-chlorooctane
1-chlorodecane
1-chloroundecane
1-chlorotridecane
1-chloropentadecane
1-chloroeicosane
1,3-dichloropropane
1,4-dichlorobutane
1,5-dichloropentane
1,6-dichlorohexane
1,20-dichloroeicosane The process of this invention accordingly employs any organic chloride within the foregoing definition having one or two chlorine atoms which are not activated.

Any carboxylic acid salt can be used in the reaction of this invention provided it is sufficiently soluble in the mutual solvents, e.g., DMF. As a matter of practicality and economy either ammonium or Group I metal salts, particularly sodium, potassium, rubidium, and cesium salts of any carboxylic acid which does not contain an interfering group such as a sulfonate group are most suitable, and particularly these salts of aromatic and aliphatic carboxylic acids, which group of organic acid salts is preferred for the reaction. The metal salts of saturated aliphatic acids, unsaturated aliphatic acids, aromatic acids, naphthenic acids and the like are intended in accordance with this invention, particularly where the metal is an alkali metal such as sodium, potassium, lithium, rubidium and cesium, and the acids have 1 to 4 carboxyl groups. Accordingly, the invention is directed to salts of carboxylic acids of the formula $$R^5(COOM)_n$$

wherein $R^5$ is $C_1$ to $C_{20}$ aliphatic, $C_6$ to $C_{18}$ aromatic, $C_3$ to $C_7$ cycloaliphatic, $C_1$ to $C_{20}$ alkyl-substituted $C_6$ to $C_{18}$ aromatic, $C_6$ to $C_{18}$ aryl-substituted $C_1$ to $C_{20}$ aliphatic, and simple 5- and 6-membered heterocyclic radicals containing one or two hetero-oxygen, -sulfur or -nitrogen atoms, M is ammonium or a Group I metal and $n$ is an integer of 1 to 4.

Examples of organic acids include but are not limited to formic, acetic, propionic, butyric, valeric, caproic, caprylic, capric, lauric, myristic, palmitic, stearic, arachidic, behenic, lignoceric and the like in the saturated aliphatic monocarboxylic acid series; oxalic, malonic, succinic, glutaric, methyl succinic, adipic, pimelic, suberic, azelaic and 1,14-tetradecanedicarboxylic acid and the like in the saturated dicarboxylic acid series; palmitoleic, oleic, linoleic, linolenic, elaidic, ricinoleic, erucic, acrylic, crotonic, vinyl acetic, fumaric, citraconic, 4-heptanoic, 2-octenoic, and ω-undecylenic acid in the unsaturated monocarboxylic and dicarboxylic acid series; and benzoic, phenylacetic, o-toluic, m-toluic, p-toluic, β-phenylpropanoic, o-tolylacetic, p-tolylacetic, 3,4-dimethylbenzoic, α-phenyl butyric, 2,4,6-trimethylbenzoic, 2-phenylpentanoic, mesitylacetic, α-naphthoic, β-naphthoic, 1,2,3,4-tetrahydro-2-naphthoic, α-naphthylacetic, β-naphthylacetic, pentamethylbenzoic, 2-phenyl-cyclohexancarboxylic, diphenylacetic, methyldiphenylacetic, α,α-diphenyl butyric and β,β,β-triphenyl propionic in the aromatic series, having up to 21 carbon atoms per molecule and such heterocyclic monocarboxylic acids as 2-furancarboxylic(2-furoic)acid, 3-furoic acid, tetrahydro-2-furoic acid, 2-thiophenecarboxylic (2-thenoic)acid, α-furylacetic, 2-tetrahydrofurylacetic acid, 2-thenylacetic, 2-pyridinecarboxylic(pincolinic)acid, 3-pyridinicarboxylic(nicotinic)acid, 3 - α - furyl-propionic acid, 2,5-dimethyl-3-furoic acid, 3-pyridylacetic acid, 5-α-furyl-valeric acid, indole-2-carboxylic acid, 2-benzofurylacetic acid, 3-quinolinecarboxylic acid, 4-dibenzofurancarboxylic acid, 2 - dibenzofurylacetic acid and β-dibenzofuran-3-acrylic acid in the $C_5$ to $C_{15}$ heterocyclic monocarboxylic acid series.

Alicyclic monocarboxylic acids within the foregoing definition are illustrated by those having a total of 4 to 11 carbon atoms such as cyclopropanecarboxylic acid, cyclobutanecarboxylic acid, cyclopropylacetic acid and cyclopentanecarboxylic acid.

The $C_5$ to $C_{13}$ alicyclic dicarboxylic acids such as 1,1-cyclopropanedicarboxylic acid, 1,1-cyclobutanedicarboxylic acid and trans-decahydronaphthylmalonic acid are included along with the $C_8$ to $C_{16}$ aromatic dicarboxylic acids such as phthalic acid, terephthalic acid, phenylmalonic acid, phenylsuccinic acid, α-phenyladipic acid and α,β-diphenylsuccinic acid. Alicyclic olefinic acids such as 1-cyclopentenyl carboxylic acid and γ-cyclohexylcrotonic acid, aromatic olefinic acids such as cinnamic acid, p-vinylbenzoic acid, and β-(1-phenanthryl)-acrylic acid, and heterocyclic olefinic acids such as 2-furylacrylic acid and 2-thienylacrylic acid, are included. The acids used as salts for the reaction may contain such other non-interfering groups as hydroxy, alkoxy, aryloxy, aldo, keto and the like.

The salt of any tricarboxylic acid or tetracarboxylic acid having an $R^5$ group within the foregoing definition can be used. Examples of such polybasic aliphatic acids are tricarballylic acid, aconitic acid and citric acid; the benzene tricarboxylic acids such as hemimellitic acid (the 1,2,3-acid) trimellitic acid (the 1,2,4-acid), trimesic acid (the 1,3,5-acid); and the benzene tetracarboxylic acids to include prehnitic acid, mellophanic acid and pyromellitic acid.

The process of this invention is carried out by reacting the ammonium or Group I metal salt of the desired carboxylic acid with the defined normal chloro-compound at any temperature which does not cause degradation of the reactants or products, in the presence of a soluble iodide catalyst and a mutual solvent as herein defined. As indicated by the test results the reaction produces the highest yields of ester product at temperatures of from 100° C. to 140° C. or higher depending on the stability of the reactants or products. In general, unless partial esters are intended, the reactants are brought together in at least stoichiometric proportions, i.e., the molar ratio of the organic acid salt to the chloro compound is at least 1:1 although for some reactants it may be desirable to use lesser amounts of the salt, e.g., about 0.5 to 0.9 mol of salt per mol of halogen compound.

The ordinary procedures for carrying out the reaction are applicable and after the reaction is completed, the mutual solvent may be removed from the ester by distillation or by washing with water. Distillation under reduced pressure produces a filterable or washable product. In most instances the aqueous layer from the washing step will contain the formed inorganic salt, the unreacted acid salt and the major portion of the solvent. Other known methods of product separation and purification may be applied.

Without limiting this invention to any theories, it is believed that the following reaction takes place in the presence of the soluble iodide, as illustrated with sodium iodide:

$$R^3Cl+NaI \rightarrow R^3I+NaCl$$
$$R^3I+NaOCOR^4 \rightarrow R^3OCOR^4+NaI$$

The sodium iodide is quite soluble in the DMF, while sodium chloride has a very low solubility in this solvent. Thus the two reactions above illustrated proceed to produce the ester, insoluble sodium chloride and the soluble sodium iodide which is available for further use. In general, about 1% to 20% by weight of the soluble iodide catalyst based on the total weight of reactants can be used and preferably about 1% to 10% by weight is used, in accordance with this invention.

The amine catalyst, though not an essential ingredient in the reaction of this invention, does have some influence and may in some instances be beneficial. Accordingly, for this purpose any tertiary amine having alkyl groups containing 1 to 5 carbon atoms can be used, e.g., trimethyl amine, triethyl amine, tripropyl amine, triisopropyl amine, tri-n-butyl amine, triisobutyl amine, tri-t-butyl amine, triamyl amine and triisoamyl amine, these species indicating that the alkyl group can be normal or branched to include secondary and tertiary alkyl groups. The amines can have mixed alkyl groups, e.g., N,N-dimethylethyl amine, N,N-diethylpropyl amine and the like or have aromatic configuration as pyridine. Catalytic amounts in the order of about 0.002% to 5% by weight of said amine or a mixture of said amines are used based on said reactants. Tripropyl amine in an amount of about 0.002% to 5% by weight and preferably about 0.5% by weight is the preferred amine catalyst.

The embodiments of the invention in which an exclusive property or privilege is claimed are defined as follows:

1. The process of producing an ester of an organic acid which comprises reacting a salt of an organic acid having the formula $$R^5(COOM)_n$$

wherein $R^5$ is a member of the group consisting of $C_1$ to $C_{20}$ alkyl, $C_6$ to $C_{18}$ aryl, $C_3$ to $C_7$ cycloalkyl, $C_1$ to $C_{20}$ alkyl-substituted $C_6$ to $C_{18}$ aryl, and $C_6$ to $C_{18}$ aryl-substituted $C_1$ to $C_{20}$ alkyl; M is a member of the group consisting of ammonium and a Group I metal and $n$ is an integer from 1 to 4, with a normal alkyl chloride of the group consisting of alkyl chlorides having 1 to 20 carbon atoms per molecule and alkylene dichlorides having 3 to 20 carbon atoms per molecule, at a temperature of at least about 100° C. in a solvent comprising a normally liquid stable amide of a carboxylic acid, having the formula $$R-\overset{O}{\underset{\|}{C}}-N(R^1)_2$$

wherein R is a substituent of the group consisting of hydrogen and $C_1$ to $C_4$ alkyl, $R^1$ is a substituent of the group consisting of hydrogen and $C_1$ to $C_4$ alkyl and at least one $R^1$ is $C_1$ to $C_4$ alkyl, in the presence of a catalytic amount of a soluble compound of iodine selected from the group consisting of alkali metal iodides, ammonium iodide, normal alkyl iodides having 1 to 10 carbon atoms per molecule and branched-chain alkyl iodides having 3 to 10 carbon atoms per molecule and mixtures thereof.

2. The process in accordance with claim 1 in which $R^5$ is $C_1$ to $C_{20}$ alkyl, M is a Group I metal and $n$ is 1.

3. The process in accordance with claim 1 in which said soluble iodine compound is an alkali metal iodide.

4. The process in accordance with claim 3 in which said alkali metal iodide is sodium iodide.

5. The process in accordance with claim 1 in which said soluble iodine compound is a normal alkyl iodide.

6. The process in accordance with claim 5 in which said normal alkyl iodide is 1-iododecane.

7. The process in accordance with claim 5 in which said normal alkyl chloride and said salt of an organic acid are present in at least stoichiometric proportions and about 1 to 20% by weight of said soluble compound of iodine is present, based on the total weight of said reactants.

8. The process of preparing decyl acetate which comprises reacting substantially equimolar quantities of 1-chlorodecane and sodium acetate in dimethylformamide as the mutual solvent at a temperature of at least about 100° C. in the presence of a catalytic amount of a soluble compound of iodine selected from the group consisting of alkali metal iodides, ammonium iodide, normal alkyl iodides having 1 to 10 carbon atoms per molecule and branched-chain alkyl iodides having 3 to 10 carbon atoms per molecule and mixtures thereof.

9. The process in accordance with claim 8 in which said soluble compound of iodine is sodium iodide.

10. The process in accordance with claim 8 in which said soluble compound of iodine is 1-iododecane.

11. The process of producing an ester of an organic acid which consists in reacting a salt of an organic acid having the formula $$R^5(COOM)_n$$

wherein $R^5$ is a member of the group consisting of $C_1$ to $C_{20}$ alkyl, $C_6$ to $C_{18}$ aryl, $C_3$ to $C_7$ cycloalkyl, $C_1$ to $C_{20}$ alkyl-substituted $C_6$ to $C_{18}$ aryl, and $C_6$ to $C_{18}$ aryl-substituted $C_1$ to $C_{20}$ alkyl; M is a member of the group consisting of ammonium and a Group I metal and $n$ is an integer of 1 to 4 with a normal alkyl chloride of the group consisting of alkyl chlorides having 1 to 20 carbon atoms per molecule and alkylene dichlorides having 3 to 20 carbon atoms per molecule at a temperature of about 100° C. to below the decomposition temperature of the ester product in N,N-dimethylformamide as the sole solvent in the presence of a catalytic amount of a soluble compound of iodine selected from the group consisting of alkali metal iodides, ammonium iodide, normal alkyl iodides having 1 to 10 carbon atoms per molecule and branched-chain alkyl iodides having 3 to 10 carbon atoms per molecule and mixtures thereof.

12. The process in accordance with claim 11 in which said reaction is conducted in the presence of a catalytic amount of a tertiary amine of the group consisting of aliphatic tertiary amines having alkyl groups of 1 to 5 carbon atoms, pyridine and mixtures thereof.

13. The process of preparing a glycol di-ester which comprises reacting an alkylene dichloride of 3 to 20 carbon atoms per molecule with an alkali metal salt of a lower fatty acid in dimethylformamide as the mutual solvent at a temperature of about 140° C. in the presence of a soluble compound of iodine selected from the group consisting of alkali metal iodides, ammonium iodide, normal alkyl iodides having 1 to 10 carbon atoms per molecule and branched-chain alkyl iodides having 3 to 10 carbon atoms per molecule and mixtures thereof.

14. The process in accordance with claim 13 in which said soluble compound of iodine is sodium iodide.

15. The process in accordance with claim 13 in which said alkylene dichloride si 1,3-dichloroethane, and said lower fatty acid salt is sodium acetate.

16. The process in accordance with claim 13 in which said temperature is about 75° C. and the product is a mixture of mono- and diesters.

References Cited

UNITED STATES PATENTS

| | | | |
|---|---|---|---|
| 2,049,207 | 7/1936 | Lawson | 260—410 |
| 2,399,959 | 5/1946 | Tucker | 260—410 |
| 3,148,207 | 9/1964 | Weinkauff et al. | 260—493 |

LORRAINE A. WEINBERGER, *Primary Examiner.*

VIVIAN GARNER, *Assistant Examiner.*